United States Patent
Russell

[11] Patent Number: 5,647,604
[45] Date of Patent: Jul. 15, 1997

[54] TRAILER HITCH

[76] Inventor: Gregory A. Russell, 9503 Norell Ave. North, Stillwater, Minn. 55082

[21] Appl. No.: 477,403

[22] Filed: Jun. 7, 1995

[51] Int. Cl.$^6$ .................................................. B60D 1/00
[52] U.S. Cl. ..................... 280/492; 280/494; 280/504
[58] Field of Search ............................ 280/400, 477, 280/492, 494, 504, 508, 515

[56] References Cited

U.S. PATENT DOCUMENTS

| | | | |
|---|---|---|---|
| 1,934,141 | 11/1933 | Prentice | 280/492 |
| 2,027,499 | 1/1936 | Tully . | |
| 2,457,885 | 1/1949 | Gatch . | |
| 2,871,030 | 1/1959 | Hollis | 280/492 |
| 3,730,557 | 5/1973 | Cox | 280/504 |
| 3,788,259 | 1/1974 | Colin | 280/508 X |
| 3,843,164 | 10/1974 | Flegel | 280/492 |
| 3,848,890 | 11/1974 | MacAlpine | 280/494 X |
| 4,193,350 | 3/1980 | Niggemeier et al. | 410/64 |
| 4,200,306 | 4/1980 | Helms | 280/494 |
| 4,548,423 | 10/1985 | Craven | 280/492 |
| 4,661,031 | 4/1987 | Heine | 411/263 |
| 4,711,461 | 12/1987 | Fromberg | 280/494 |
| 4,747,612 | 5/1988 | Kuhn | 280/508 X |
| 5,129,966 | 7/1992 | Rao | 148/143 |
| 5,253,949 | 10/1993 | Oxley et al. | 403/317 |

*Primary Examiner*—Brian L. Johnson
*Assistant Examiner*—Victor E. Johnson
*Attorney, Agent, or Firm*—Crowell & Moring LLP

[57] ABSTRACT

An improved trailer hitch which can be used to more easily attach a trailer to a towing vehicle by simply engaging a horizontal coupling shaft in a latch assembly, and closing the latch. The trailer hitch comprises six main components: a yoke assembly, a latch assembly, a transverse horizontal coupling shaft, a connector bar, a trailer yoke and a pivot bolt. The yoke assembly provides for rotation about the vertical axis, the latch assembly provides for rotation about the transverse horizontal axis, and the pivot bolt for rotation around the longitudinal horizontal axis. A trailer can be easily attached to a towing vehicle by placing the transverse horizontal shaft in the latch assembly, and closing and fastening the latch.

24 Claims, 3 Drawing Sheets

TRAILER HITCH

BACKGROUND

1. Field of the Invention

The present invention is a three-way swivel action trailer hitch.

2. Background of the Invention

Trailer hitches are used to provided rotatable mechanical coupling between a towing vehicle and a trailer. The mechanical coupling is preferably rotatable around all three axes, to allow the trailer to be towed around turns, up and down inclines, and over uneven pavement.

Trailer hitches having three-way rotatable coupling between the towing vehicle and the trailer are known in the art. For example, U.S. Pat. No. 4,711,461, which is incorporated herein by reference, discloses a three-axis trailer hitch comprising a first U-shaped yoke supporting a hinge pin rotating about the transverse horizontal axis, a second U-shaped yoke supporting a hinge pin rotating about the vertical axis, and a rotatable joint providing rotation about the longitudinal horizontal axis. U.S. Pat. No. 2,027,499 to Tully discloses a trailer hitch comprising a turntable disc providing rotation about the longitudinal horizontal axis, and a U-shaped yoke supporting a king pin rotating about the transverse horizontal axis, and a swivel bolt providing rotation about the vertical axis. Other trailer hitches are disclosed in U.S. Pat. Nos. 2,457,885; 2,871,030; 3,730,557; 3,843,164; 4,200,306; and 4,548,423.

SUMMARY OF THE INVENTION

The present invention is an improved trailer hitch which can be used to more easily attach a trailer to a towing vehicle. In the present invention, the trailer can be attached to the towing vehicle simply by engaging a horizontal coupling shaft in a latch assembly, and closing the latch.

As shown in FIG. 1, the trailer hitch of the present invention comprises six main components: a yoke assembly, latch plates, a transverse horizontal coupling shaft, a connector bar, a trailer yoke assembly and a pivot bolt. The trailer yoke assembly provides for rotation about the vertical axis, the transverse horizontal shaft provides for rotation about the transverse horizontal axis, and the pivot bolt for rotation around the longitudinal horizontal axis.

A trailer can be easily attached to a towing vehicle by placing the transverse horizontal shaft in the yoke assembly, and closing and fastening the latch.

It is the object of the present invention to provide a three-way swivel action trailer hitch that can be used to easily and securely attach a trailer to a towing vehicle.

This object, and other objects of the present invention are described in greater detail in the detailed description of the invention, the appended drawings and the attached claims.

DETAILED DESCRIPTION OF THE INVENTION

Figure 1:
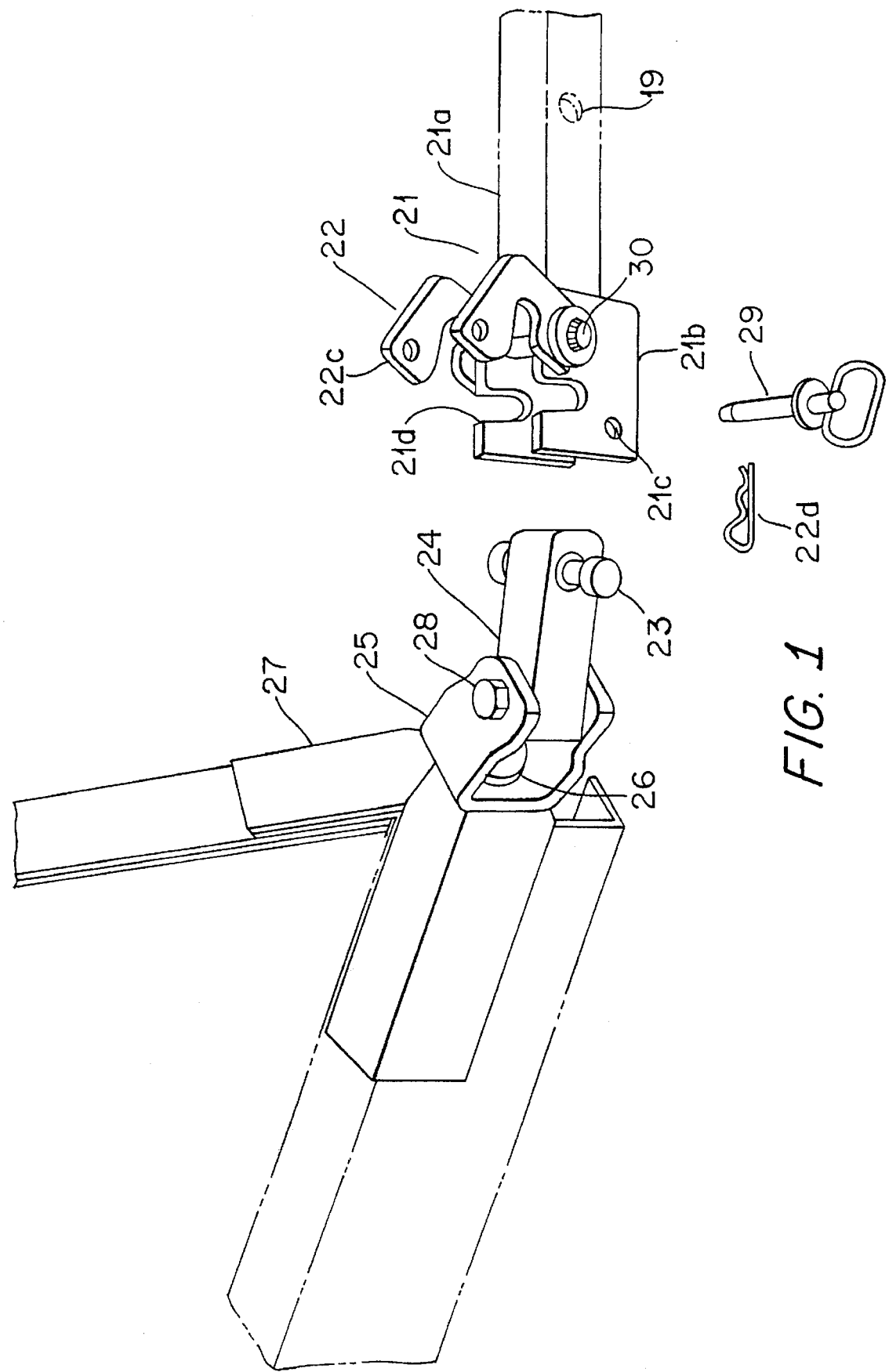
FIG. 1 is a perspective view of the trailer hitch, just before the transverse horizontal shaft is engaged in the latch assembly.

FIG. 1 is a schematic diagram of the present invention. The trailer hitch of the present invention is comprised of six main components: yoke assembly 21, latch plates 22, horizontal coupling shaft 23, connector bar 24, trailer yoke 25 and pivot bolt 26.

Yoke assembly 21 comprises a rectangular yoke section 21a and a latch section 21b. Yoke section 21 a includes a hole 19 which is used to attach the yoke to a towing vehicle, using a retainer pin (not shown). Yoke assembly also includes hitch pin 29, which is used to hold latch plates 22 in position over coupling shaft 23.

Latch plates 22 are pivotally attached to latch section 21b by pivot bolt 30. Horizontal coupling shaft 23 passes through connector bar 24, such that it will fit into the vertical openings 21d of latch section 21b. At its opposite side, coupling shaft 23 is secured to yoke section 21b by closing latch plates 22 over coupling shaft 23, and passing hitch pin 29 through holes 22c in latch plates 22 and holes 21c in latch section 21b. Hairpin cotter pin 22d prevents hitch pin 29 from slipping out of position.

Latch plates 22 could be two separate latch plates, as shown in FIG. 1, or could be two latch plates which have been integrally connected to form a single unit. Latch plates 22 could also be manufactured as a single unit.

The opposite end of connector bar 24 is attached to U-shaped trailer yoke 25 by vertical pivot bolt 28. Rotation about vertical pivot bolt 28 provides for left-right rotation of the trailer with respect to the towing vehicle about the vertical axis. Yoke 25 is attached to trailer bracket 27 by longitudinal pivot bolt 26. Trailer yoke 25 can pivot around longitudinal pivot bolt 26, thus providing the hitch with rotation about the horizontal longitudinal axis.

Figure 2:
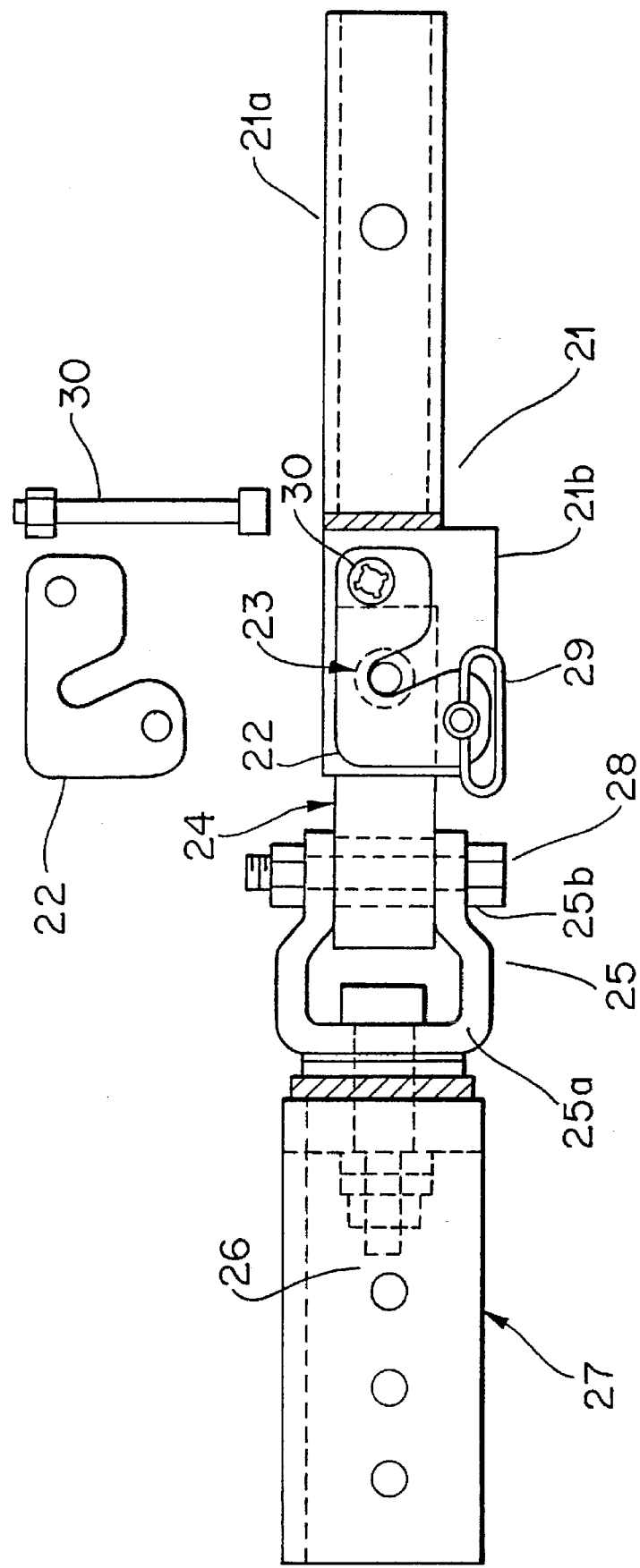
FIG. 2 is a side view of the present invention, with the transverse horizontal shaft engaged in the latch assembly.
Figure 3:
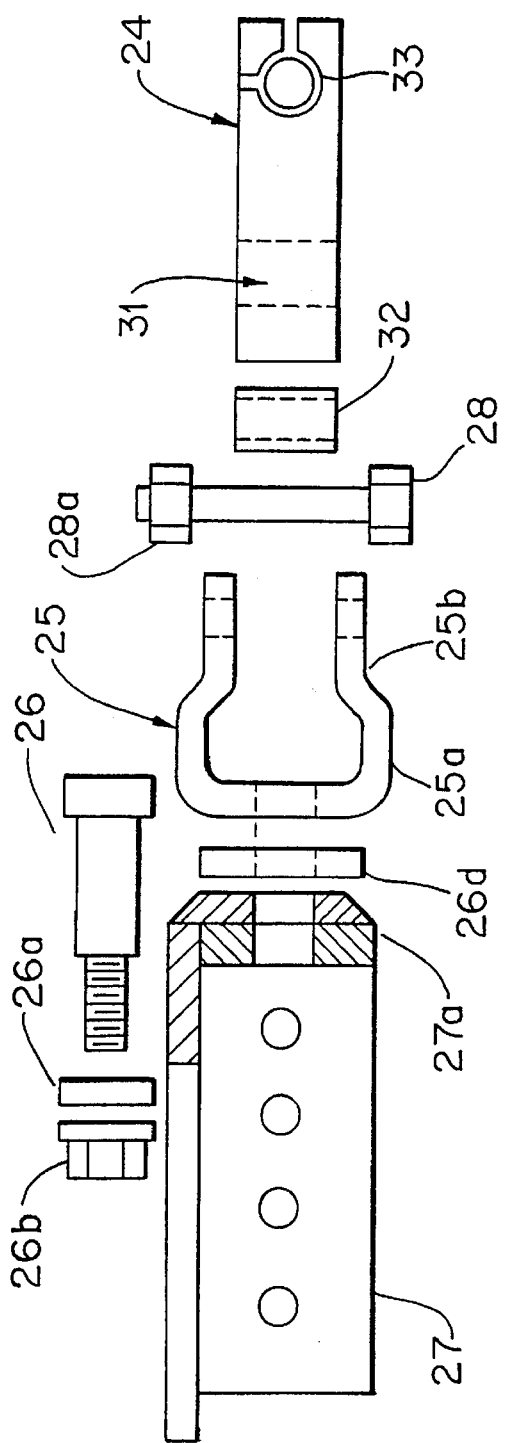
FIG. 3 is an exploded side view of the trailer-side portion of the trailer hitch, including the pivot bolt, the trailer yoke and the connector bar.

FIG. 2 is a side view of the present invention, with horizontal coupling shaft 23 engaged in latch assembly 22. FIG. 2 provides a clear view of pivot bolt 26. FIG. 3 is an exploded view of the trailer-side of FIG. 2, showing pivot bolt 26, flat washer 26a, flange nut 26b, vertical pivot bolt 28 and locking nut 28a. FIG. 3 also shows connector bar 24, which comprises hole 33, hole 31, and sleeve 32. When the trailer hitch is assembled, horizontal coupling shaft 23 is inserted through hole 33, sleeve 32 is inserted in hole 31, and vertical pivot bolt 28 is inserted in sleeve 32. Vertical pivot bolt 28 is then secured with locking nut 28a. The length of sleeve 32 is slightly greater than the height of connector bar 24, such that, when yoke 25 is secured to connector bar 24, it is free to rotate around the vertical axis.

Figure 4:
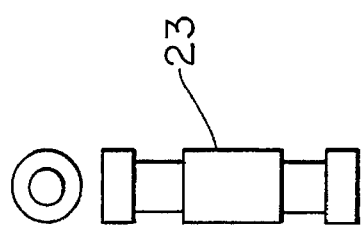
FIG. 4 is a schematic diagram of the horizontal coupling shaft.

FIG. 4 is a schematic diagram of horizontal coupling shaft 23. To maximize the strength of the trailer hitch, bolts 26, 28 and 30 are preferably selected from bolts which have been heat treated to meet the strength requirements of SAE (Society of Automotive Engineers) grade 8. Horizontal coupling shaft 23 is preferably manufactured from material which has been heat treated such that it has a Brinell Hardness Number between 269 and 321 (inclusive).

Yoke 25 is shown in FIGS. 1 and 2 as having a relatively wide plate section 25a compared to the distance across the end portion of its forward arm section 25b holding vertical bolt 28. The greater width for the plate section allows for the use of large diameters for the shaft and head of pivot bolt 26, and provides a mechanical advantage with respect to the weight of the trailer's tongue applied against pivot bolt 26.

Figure 5:
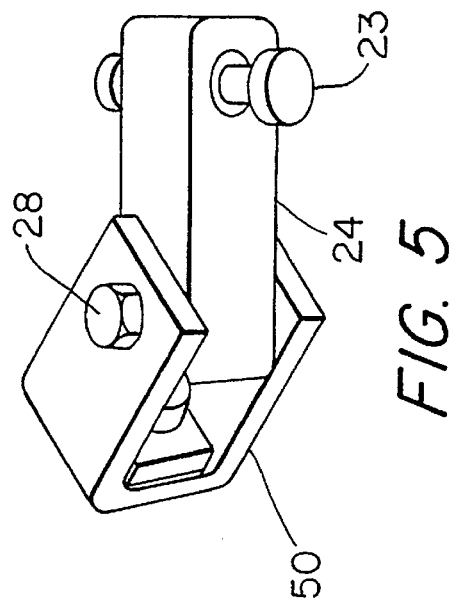
FIG. 5 is a schematic diagram of a trailer yoke having flat, parallel arms, and the connector bar.

However, the present invention could also be implemented using a flat-armed, U-shaped yoke, as shown in FIG. 5. FIG. 5 shows flat-armed, U-shaped yoke 50 pivotally connected by pivot bolt 28 to connector bar 24.

Plate 27a in FIG. 3 is an, e.g., one-inch thick plate that is welded into position as shown. The length of the smooth section of pivot bolt 26, i.e., the section between the threaded section of pivot bolt 26 and the head of pivot bolt 26, is slightly longer than the sum total of the thicknesses of plate 27a, washer 26d, and plate section 25a of yoke 25. The additional length of pivot bolt 26 is required to allow the rotation of the trailer hitch around the longitudinal axis.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A trailer hitch comprising:
   (a) a yoke assembly comprising a yoke section and a latch section, said latch section comprising a vertical opening;
   (b) a latch assembly comprising a latch pivot bolt, and two latch plates pivotally connected on either side of the yoke section by the latch pivot bolt to the yoke assembly;
   (c) a transverse horizontal coupling shaft having extremal ends, wherein the extremal ends of the horizontal coupling shift are dimensioned to fit into the vertical opening in the latch section, and to be secured by the latch plates;
   (d) a connector bar, said transverse coupling shaft passing transversely and horizontally through the connector bar, wherein the transverse horizontal coupling shaft can be securely and pivotally connected to the latch assembly by placing the horizontal transverse coupling shaft in the vertical opening of the latch section, rotating the latch plats down over the horizontal transverse coupling shaft, and securing the latch plates in position with a hitch pin;
   (e) a trailer yoke, said connector bar pivotally connected to the trailer yoke by a vertical pivot bolt; and
   (f) a longitudinal pivot bolt for longitudinally and pivotally connecting the trailer yoke to a trailer.

2. The trailer hitch of claim 1, wherein the trailer yoke is a flat U-shaped trailer yoke.

3. The trailer hitch of claim 1, wherein the trailer yoke has a plate section and an arm section, said arm section comprising two spaced apart arms, each arm having a forward section and a rearward section, and wherein the distance between the forward sections of the spaced apart arms is less than the width of the plate section.

4. The trailer hitch of claim 1, wherein the latch pivot bolt, the vertical pivot bolt and the longitudinal pivot bolt have been heat treated.

5. The trailer hitch of claim 4, wherein the latch pivot bolt, the vertical pivot bolt and the longitudinal pivot bolt have been heat treated to meet the strength requirements of SAE grade 8.

6. The trailer hitch of claim 1, wherein the transverse horizontal coupling shaft has been heat treated.

7. The trailer hitch of claim 6, wherein the transverse horizontal coupling has a Brinnell hardness number between 969 and 321, inclusive.

8. A trailer hitch assembly comprising:
   (a) A longitudinal pivot bolt for pivotally attaching a first yoke to a trailer hitch;
   (b) a vertical pivot bolt for pivotally attaching the first yoke to a connector bar;
   (c) a transverse horizontal coupling shaft, for pivotally attaching the connector bar to a second yoke, wherein the second yoke has a vertical opening adapted to receive the transverse horizontal coupling shaft; and
   (d) at least one latch plate pivotally connected by a latch pivot bolt to the second yoke such that the at least one latch plate can be rotated to secure the transverse horizontal coupling shaft in the vertical opening of the second yoke.

9. The trailer hitch of claim 8, wherein the at least one latch plate comprises two latch plates, wherein both latch plates can be rotated to secure the transverse horizontal coupling shaft in the vertical opening of the second yoke.

10. The trailer hitch assembly of claim 9, wherein the first yoke is a flat U-shaped yoke.

11. The trailer hitch assembly of claim 9, wherein the trailer yoke has a plate section and an arm section, said arm section comprising two spaced apart arms, each arm having a forward section and a rearward section, and wherein the distance between the forward sections of the spaced apart arms is less than the width of the plate section.

12. The trailer hitch assembly of claim 9, wherein the latch pivot bolt, the vertical pivot bolt and the longitudinal pivot bolt have been heat treated.

13. The trailer hitch assembly of claim 12, wherein the latch pivot bolt, the vertical pivot bolt and the longitudinal pivot bolt have been heat treated to meet the strength requirements of SAE grade 8.

14. The trailer hitch assembly of claim 9, wherein the transverse horizontal coupling shaft has been heat treated.

15. The trailer hitch assembly of claim 14, wherein the transverse horizontal coupling shaft has a Brinnell hardness number between 269 and 321, inclusive.

16. The trailer hitch assembly of claim 9, further comprising a hitch pin for insertion through holes in the latch plates and through holes in the second yoke to secure the latch plates in a closed position.

17. A trailer hitch for coupling a trainer to a towing vehicle comprising:
   (a) a first U-shaped yoke having a base plate and two spaced apart arms extending forwards from the base plate;
   (b) a longitudinal pivot bolt inserted in a hole in the base plate having a head, the head of the longitudinal pivot bolt being forward of the base plate, for connecting the first U-shaped yoke to a trailer;
   (c) a vertical pivot bolt, inserted vertically through holes in the arms of the base plate, connecting for the U-shaped yoke to a connector bar;
   (d) a horizontal coupling shaft, inserted transversely through a hole in the connector bar, left and right positions of the horizontal coupling shaft extending on either side of the connector bar;
   (e) a second U-shaped yoke having two spaced-apart parallel arms, said parallel arms each having a vertical opening therein, such vertical openings being adopted to engage the position of the horizontal coupling shaft extending on either side of the connector bar; and
   (f) at least one latch plate pivotally attached to the second U-shaped yoke, said at least one latch plate configured such that when the horizontal coupling shaft is engaged in the vertical openings in the parallel arms of the second U-shaped yoke, the at least one latch plate can be rotated over the horizontal coupling shaft to secure the horizontal coupling shaft in position.

18. The trailer hitch of claim 17, wherein the at least one latch plate comprises two latch plates, wherein both latch plates are pivotally attached to the second U-shaped yoke, and can be rotated over the horizontal coupling shaft to secure the horizontal coupling shaft in position.

19. The trailer hitch of claim 18, wherein the longitudinal pivot bolt and the vertical pivot bolt have been heat treated.

20. The trailer hitch of claim 18, wherein the longitudinal pivot bolt and the vertical pivot bolt have been heat treated to meet the strength requirements of SAE grade 8.

21. The trailer hitch of claim 18, wherein the arms of the first U-shaped yoke are flat and parallel to each other.

22. The trailer hitch of claim 18, wherein the spaced arms of the fast U-shaped yoke have a rearward portion and a forward portion, and the distance between the spaced apart arms is greater in the rearward portion than in the forward portion.

23. The trailer hitch of claim 18, wherein the transverse horizontal coupling shaft has been heat treated.

24. The trailer hitch of claim 18, wherein the transverse horizontal coupling shaft has a Brinnell hardness number between 269 and 321, inclusive.

* * * * *